United States Patent [19]

Younger

[11] Patent Number: 4,930,487

[45] Date of Patent: Jun. 5, 1990

[54] CEMENT CUTTING BLADE

[76] Inventor: Rick Younger, 1730 Primrose Path, Las Vegas, Nev. 89108

[21] Appl. No.: 416,858

[22] Filed: Oct. 4, 1989

[51] Int. Cl.$^5$ .......................... B28D 1/04; E01C 23/09
[52] U.S. Cl. .................... 125/15; 51/206 R; 51/206.5; 299/39; 299/89; 404/87
[58] Field of Search ........................ 299/38, 39, 89, 79; 404/74, 87, 90, 94; 125/15; 51/326, 327, 206 R, 206.4, 206.5

[56] References Cited

U.S. PATENT DOCUMENTS

| | | | |
|---|---|---|---|
| 3,016,661 | 11/1959 | Nielsen | 51/206 R |
| 3,122,030 | 8/1960 | Metzger | 76/112 |
| 3,127,887 | 3/1963 | Metzger | 125/15 |
| 3,612,611 | 12/1971 | Ellis | 299/89 |
| 3,753,430 | 6/1972 | Oas | 125/14 |
| 3,886,925 | 6/1975 | Regan | 125/15 |
| 4,456,303 | 6/1984 | Due | 299/10 |

FOREIGN PATENT DOCUMENTS

| | | | |
|---|---|---|---|
| 278721 | 9/1970 | U.S.S.R. | 51/206 R |
| 259124 | 10/1970 | U.S.S.R. | 299/39 |

*Primary Examiner*—Jerome W. Massie, IV
*Assistant Examiner*—David J. Bagnell
*Attorney, Agent, or Firm*—Quirk, Tratos & Roethel

[57] ABSTRACT

An improved circular saw blade assembly for cutting in a single pass a two tier groove in a concrete areaway. The saw blade body having a first row of cutting elements in the form of a metallic matrices containing fragmented diamond particles secured to the blade body periphery. A plurality of cutting blocks formed of the same material as the cutting elements are positioned in a circular configuration intermediate the periphery and the center of the blade body. The cutting blocks are secured to the blade body so as to position the cutting faces on the cutting blocks on each side of the blade whereby the cutting faces coact to cut a groove in the concrete above and wider than the groove cut by the peripheral cutting elements.

20 Claims, 5 Drawing Sheets

CEMENT CUTTING BLADE

BACKGROUND OF THE INVENTION

The present invention relates to circular saw blades used to cut expansion grooves in concrete areaways or the like. The cut grooves are then filled with a compression sealant of neoprene or other similar synthetic rubberlike material which allows the grooves to function as expansion joints in response to temperature induced expansion or contraction.

The current state of the art of expansion joints indicates a preference for a two tier joint that is commonly made in two cutting steps. The first step involves the cutting of a narrow groove to a predetermined depth. This is followed by the cutting of a second wider groove cut to a lesser depth above the narrow groove. This wider and shallower groove receives the compression seal material. The two cutting step approach has an obvious disadvantage in that after the first cut is made the blade must be changed to a smaller diameter and wider blade before the second cut can be made. An example of this approach is shown in U.S. Pat. No. 4,456,303.

The prior art as exemplified by L. H. Metzger U.S. Pat. No. 3,127,837 disclosed an early attempt at a saw blade assembly capable of cutting a two tier groove in a single pass of the blade over the concrete. The saw blade assembly disclosed comprised a composite blade body including a pair of outside cutting disks and a central inside spacer and routing disk. The central spacer and routing disk is of larger diameter then the diameter of the outer cutting disks with the diameter of the outer disks being equal. This three blade construction as disclosed was a complicated and expensive blade assembly.

Russian patent 259,124 discloses a "Road Surface Cutter" for making seams in the hardened surfaces of roads, airfields, etc. that produces a stepped seam in one cut. The disclosed cutter comprises a circular blade body or core having a thick, metal, center disk portion and a thin rim surrounding the center disk portion. The perimeter of the disk portion on each side of the rim is covered with rings of cutting material, the rings being made of metallic matrix with abrasive matter such as diamond fragments embedded therein. There appears to be little provision for protecting the core against premature wear in critical areas caused by abrasive particle buildup during the sawing operation.

It is an object of the present invention to provide a saw blade of relatively simple construction that would enable a two tier expansion joint to be cut efficiently in a single pass over a paved areaway.

More particularly it is an object of the present invention to provide a saw blade in which the saw blade assembly includes a single circular blade body or core of uniform thickness having a plurality of spaced cutting elements secured to the periphery of the blade body and also having a plurality of spaced cutting blocks arranged in a circular configuration on the blade body intermediate the periphery and the blade center whereby a two tier expansion groove is automatically cut in a single pass over the paved area.

It is a further object of the present invention to provide a saw blade that has provision for the flow of coolant over and around the cutting elements and cutting blocks thereby to increase the cutting life of the blades and to allow the cutting speed of the blade to be increased.

These and other objects of the invention will be apparent from the following disclosure of preferred embodiments thereof.

BRIEF SUMMARY OF THE INVENTION

The present invention relates to an improved saw blade assembly for cutting in a single pass a two tier expansion groove in a concrete areaway. The saw blade assembly includes a single circular blade of uniform thickness having a plurality of cutting elements secured to the periphery of the blade, the cutting elements being in the form of metallic matrices containing fragmented diamond particles. The improvement comprises a plurality of cutting blocks, also in the form of diamond fragment impregnated matrices providing cutting faces, that are mounted on the blade body. The circular blade body intermediate its periphery and its center having a plurality of spaced cutting block mounting positions arranged in a circular configuration concentrically of the blade body periphery. The cutting blocks are secured at the blade body mounting positions by retention devices.

DETAILED DESCRIPTION OF THE INVENTION

Figures 1, 2, 3, 4, 5, 6:
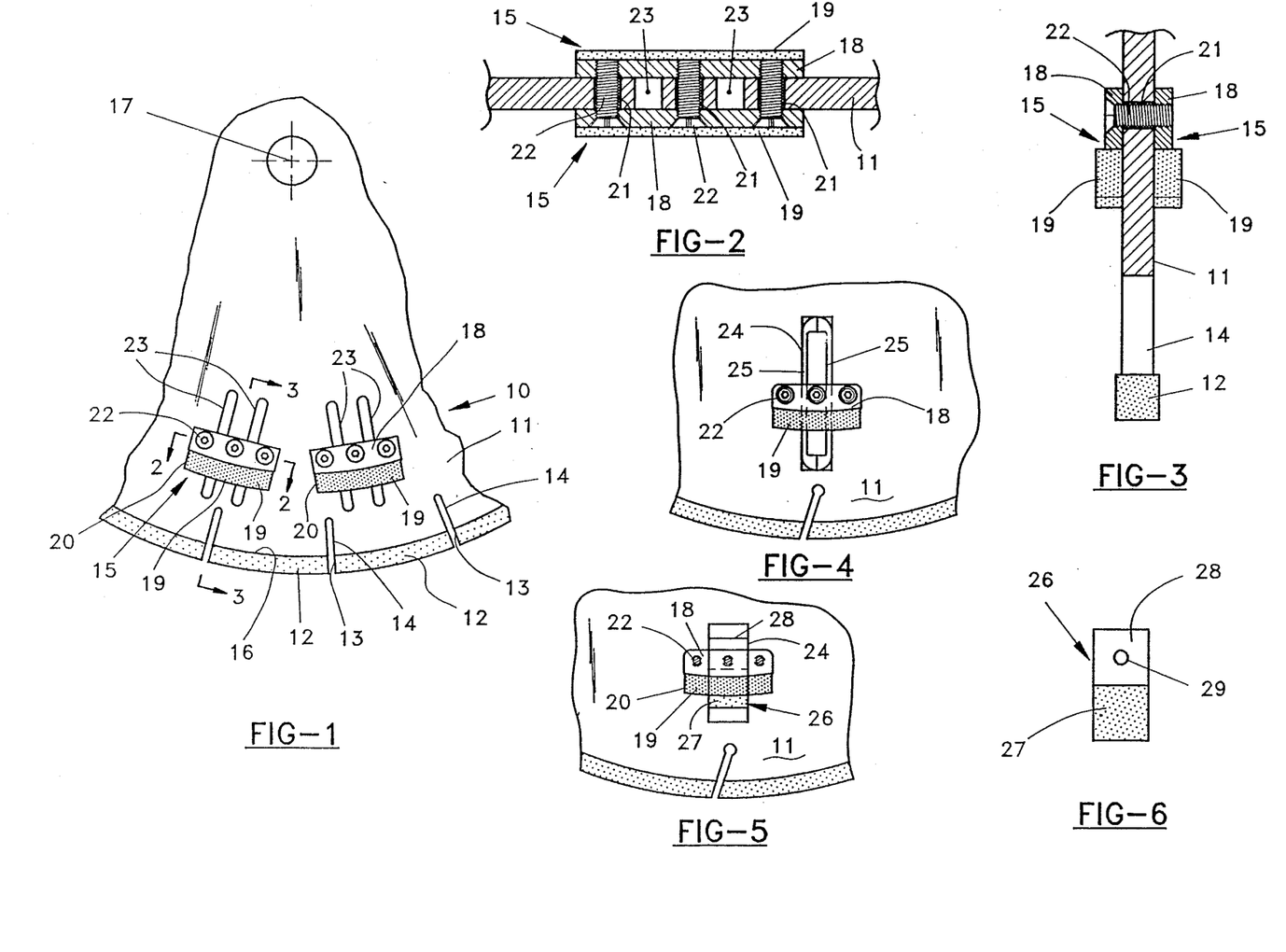
FIG. 1 is a fragmentary side elevational view of a saw blade assembly constructed according to the principles of the present invention.
FIG. 2 is a sectional view taken on the line 2-2 of FIG. 1; o
FIG. 3 is a sectional view taken on the line 3-3 of FIG. 1.
FIG. 4 an enlarged fragmentary elevational view of a modified portion of FIG. 1.
FIG. 5 is an enlarged fragmentary elevational view of a further modified portion of FIG. 1.
FIG. 6 an elevational view of component of the structure shown in FIG. 5.

Referring first to FIGS. 1 to 3, the saw blade assembly generally designated 10, only a fragmentary portion of which is shown, comprises a single, metal, circular blade body 11 of uniform thickness having a plurality of peripherally mounted cutting elements 12. The cutting elements 12 are in the form of metallic matrices containing fragmented diamond particles. The cutting elements 13 are separated by gaps 13 that communicate With slots 14 in the blade body 11. The slots 14 function to increase the turbulence and therefore the cooling effect of the coolant applied to the rotating blade during the sawing operation. The flow of the coolant also causes the abrasive particles of concrete to be washed away therefore decreasing the wear on the core. The foregoing features as broadly described are well known in the concrete saW blade art as noted in L.H. Metzger U.S. Pat. No. 3,127,897.

In accordance with the present invention a second set of cutting elements, hereinafter referred to as cutting blocks 15, are mounted on the blade body intermediate its periphery 16 and the blade body 17 center. Each cutting block 15 consists of a metal support plate 18 to Which is bonded a metallic matrix 19 containing fragmentary diamond particles. The blade body 11 has a plurality of spaced Cutting block positioning means arranged in a circular configuration concentrically of the blade body periphery. At best seen in FIG. 2, the positioning means comprises a set of three tapped holes 21 adapted to receive fastening devices in the form of sCrews 22 for securing the cutting block support plates 18 and thereby the matrices 19 to the blade body 11. The cutting blocks 15 are mounted in aligned pairs on opposite sides of the blade body 11.

The blade body 11 is provided with a pair of parallel, elongated, radially extending slots 23 partially underlying each aligned pair of blocks 15. The slots 23 permit coolant to flow around the blocks 15 during the sawing operation.

In operation the saW blade assembly 10 is able to cut a two tier expansion joint in a concrete or other paved areaway. The portion of the saw blade 10 between the cutting elements 12 and the cutting blocks 15 cuts a groove having the width of the cutting elements 12. The cutting faces 20 on the aligned pairs of cutting blocks 15 coact to cut a groove above and wider than the groove being cut by the cutting elements 12. For example, the specification for an airport concrete runway may require a 14 inch thick layer of concrete. The groove to be cut by the peripheral cutting elements is required to be ⅛ of an inch wide and 3 ½ inches deep from the surface. The second grooVe to receive the neoprene or synthetic rubber compression seal is required to be ½ inch wide and the depth to be substantially less than that of the groove cut by the cutting elements. The depth of the second groove may vary depending on requirements established by the compression seal manufacturer. The saW blade assembly can be manufactured to accommodate any desired depth for the compression seal. The set of screW holes 21 can be radially located to position the cutting blocks closer to or further away from the blade periphery to meet the compression seal depths requirements.

The advantage derived from the two tier expansion joint with the increased depth of the narrow groove is that any crack that may developed in the concrete will occur below the lower end of the narrow groove thus preserving the integrity of the compression seal portion of the expansion groove.

Depending on the nature of the aggregate used in the concrete, it has been found that critical areas of the blade body adjacent the cutting faces of the cutting blocks will show premature Wear. FIG. 4 and FIGS. 5 and 6 show two ways of minimizing this wear by utilizing wear resistant elements.

In FIG. 4, a single enlarged width slot 24 has been shown in place of the slots 23 shown in FIG. 1. The slots 24 are fitted with strips 25 of tungsten carbide having a hardness of approximately Rockwell C65 or diamond impregnated material. The wear strips 25 are effective to break up any aggregate particles that would cause wear on the blade body surfaces adjacent the cutting blocks 15.

In FIG. 5, the slots 24 are filled With a wear resistant insert having a metallic matrix portion 27 containing fragmented diamond particles. As shown in FIG. 6, the matrix portion 27 is attached to a tab portion 28 having a screw hole 29 adapted to receive the central screw 22 of the screWs holding the cutting blocks 15 in place on the blade body 11. The wear resistant inserts 27 being in position to break up any aggregate dragging under the cutting blocks 15, are able to minimize wear on critical areas of the blade body adjacent the cutting blocks 15.

Figure 7:
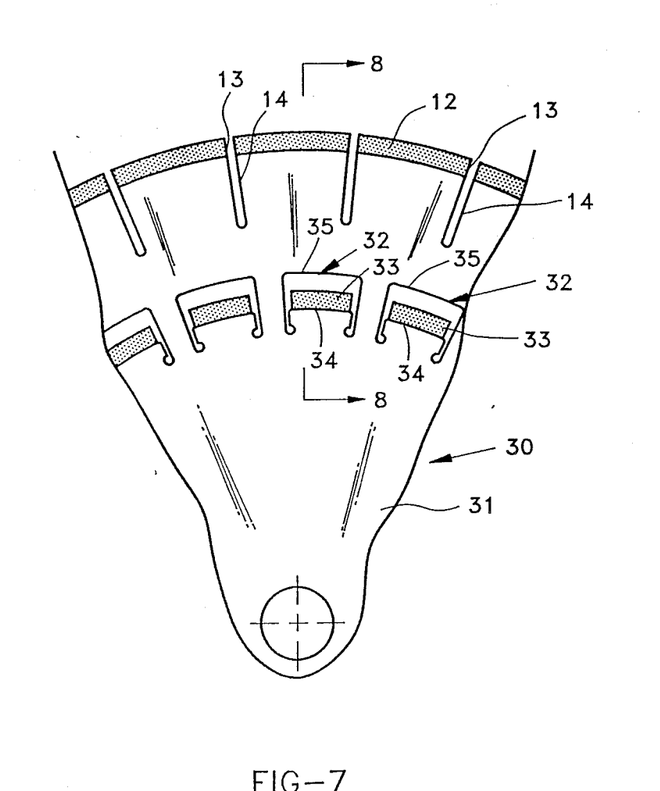
FIG. 7 is a fragmentary view of a saw blade assembly in part similar to FIG. 1 showing a further embodiment of the invention.
Figure 8:
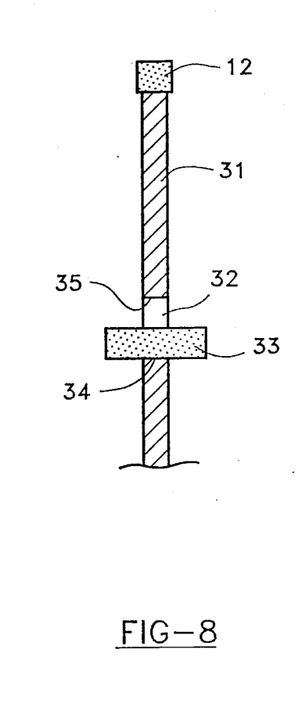
FIG. 8 is a sectional view taken on the line 8-8 of FIG. 7.

In the form of the invention shown in FIGS. 7 and 8, the saw blade assembly, generally designated as 30, has the same peripheral cutting elements as FIG. 1 embodiment. That is, the saw blade assembly has a plurality of peripherally mounted cutting elements 12 separated by gaps 13 that communicate with coolant distributing slots 14.

In this form of the invention, the blade body, herein designated 31, has a plurality of circularly spaced circular ring sector openings 32. Each opening contains a cutting block 33 a metallic matrix containing fragmented diamond particles; the matrix being in the shape of a slab. Each cutting block 33 has a length less the circular width of the opening 32, a thickness less than the distance between the inner radial edge 34 and the outer radial edge 35 of the opening and a width greater than the thickness of the blade body 31. The width of the cutting block 33 in relation to the thickness of the blade body 32 is best seen in FIG. 8. Lengthwise the slab forming the cutting block 33 has a slight curvature complementary to the curvature of the inner radial edge 34 of the opening 32. The cutting blocks 33 are retained in the openings by being bonded or otherwise secured, as by silver solder, to the inner radial edge 34 of the opening 32.

As shown in FIG. 8, each cutting block extends laterally of the blade 31 thereby providing cutting faces on both sides of the blade effective to cut a second tier groove of the desired width. The clearance of the openings 32 on all sides of the cutting blocks 33, except the bonded side, is great enough to allow coolant to flow around each cutting block during the sawing operation.

Referring now to FIGS. 9 to 12, inclusive, a further embodiment of the invention Comprises a saw blade assembly, herein designated 40 having cutting elements 12 located on the periphery of the blade body 41.

Figure 9:
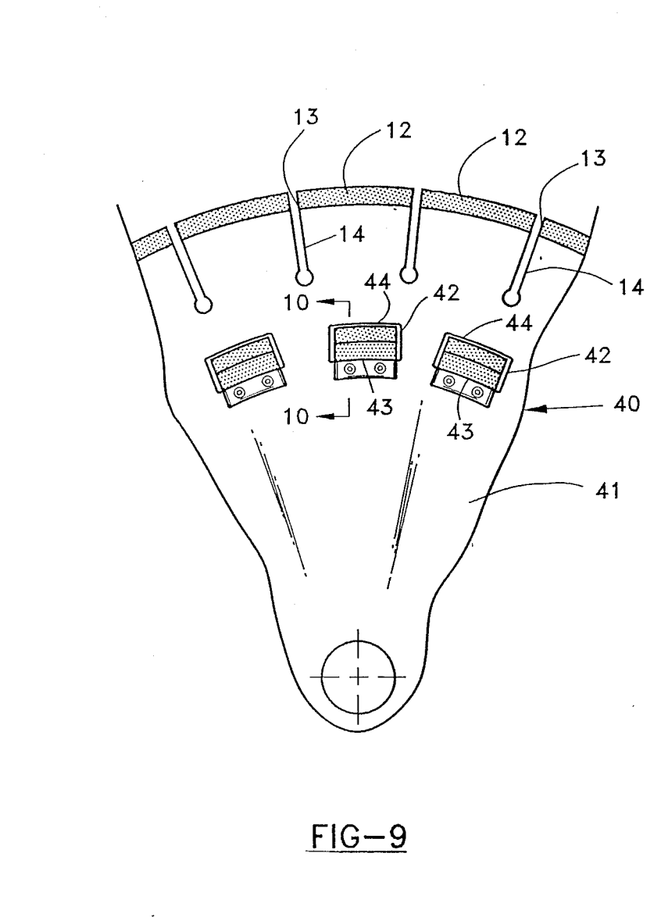
FIG. 9 is a fragmentary side elevation view in part similar to FIG. 1 showing a further modification of the saw blade assembly.
Figure 10:
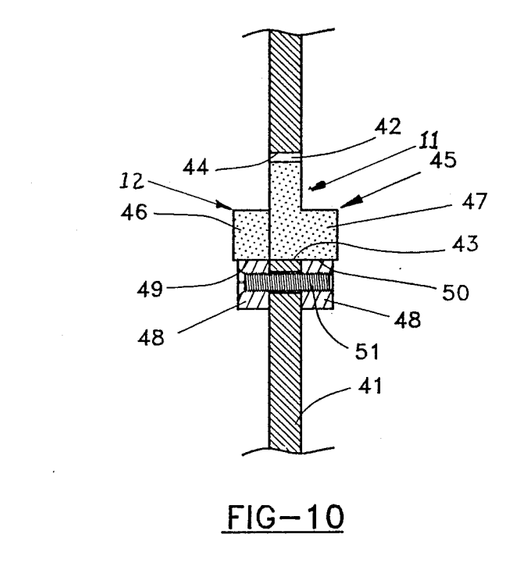
FIG. 10 is a sectional view taken on the line 10 of FIG. 9.
Figure 11:
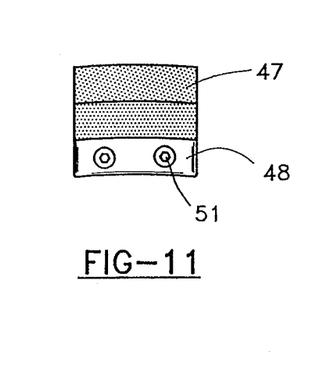
FIG. 11 is a view taken looking in the direction of the arrow 11 in FIG. 10.
Figure 12:
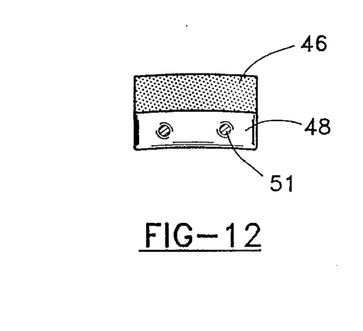
FIG. 12 is a view similar to the view in FIG. 11 showing a further embodiment of the invention.

In this embodiment the blade 41 is provided with an inner circle of substantially rectangular openings 42 with its inner edge 43 and outer edge 44 being curved to be concentric with the periphery of the blade body. Each cutting block 45 is formed of two elongated matrix pieces 46 and 47, each impregnated with diamond cutting fragments. The matrix piece 46 is of substantially square cross section and the matrix piece 47 is of substantially L-shaped cross sections, as best as seen in FIG. 10. The longitudinal length of each matrix piece is substantially equal to the circumferential length of a rectangular opening 42. The vertical height of the L-shaped cross section of the matrix piece 47 is substantially equal to the distance between the inner edge 43 and the outer edge 44 of the openings.

Support members 48 are bonded or otherwise secured to the base edge 49 of the square cross section matrix piece and to the base edge 50 of the L-shaped matrix piece 47.

Fastener devices, such as screws 51 secure each of the matrix piece support members 48 to the blade body 11 and to each other adjacent the inner edge 43 of the rectangular openings 442. the secured matrix pieces form a cutting block 45 of substantially T-shape having cutting portions extending equidistantly through the rectangular opening to both sides of the blade body 11.

As with the previously described embodiments, the cutting block 45 is able to cut an upper tier groove to the desired width to receive a compression seal.

Figure 13:
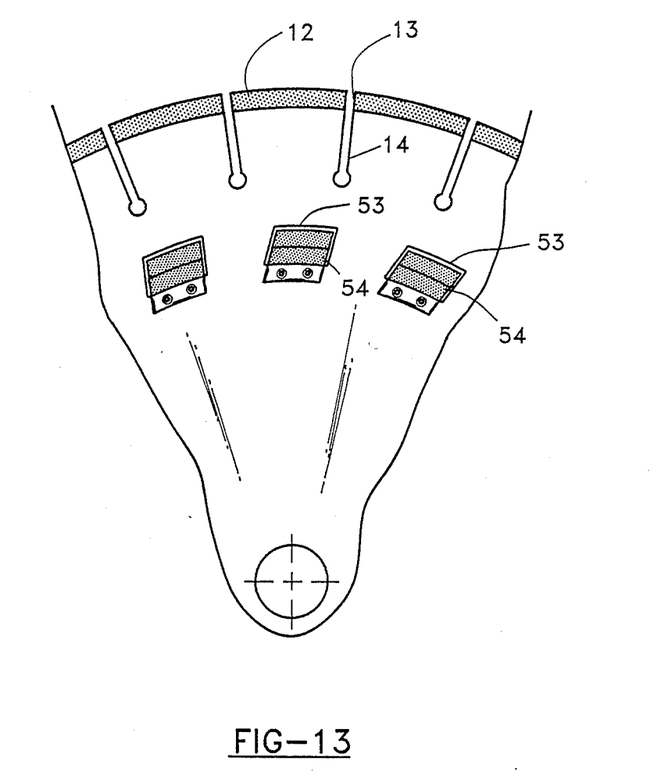
FIG. 13 is a fragmentary side elevational view in part similar to FIG. 9 showing a further modification of the saw blade assembly closely related to the FIG. 12 embodiment.
Figure 14:
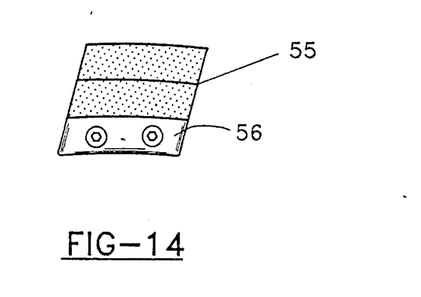
FIGS. 14 and 15 are side elevational views of modified versions of the components shown in FIGS. 11 and 12, respectively.
Figure 15:
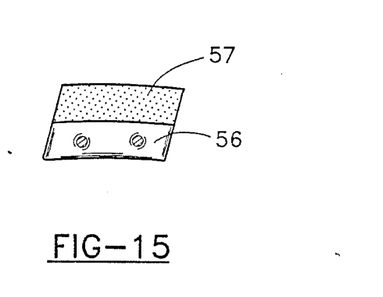

Referring now to the further embodiment of the invention shown in FIGS. 13 to 15, the saw blade assembly is closely related to the previously described embodiment of FIGS. 9 to 12, inclusive, The major difference is that the rectangular openings 53 and the cutting blocks 54 are canted or angularly inclined from the squared positions of the rectangular openings 42 and cutting blocks 45 shown and described with respect to FIGS. 9 to 12. FIG. 14, for example, shows a matrix piece 55 mounted on a support member 56 that corresponds to the matrix piece 47 and support member 48 of FIG. 11, except for the angular tilt. FIG. 15 shows a matrix piece 57 supported on support member 56 that corresponds to the matrix piece 46 mounted on the support member 48, except for canted or inclined relationship. Cooling water applied to the blade body will flow past the cutting blocks to cool the same. The slanted or inclined sides of the cutting blocks 54 will assist the flow water past the cutting blocks and help sweep cutting debris away from the cutting blocks.

Figure 16:
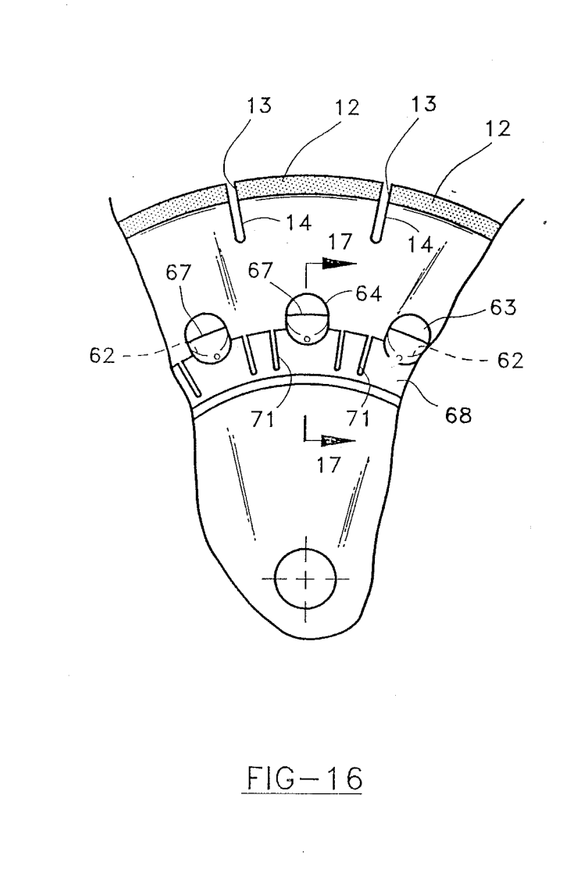
FIG. 16 is a fragmentary side elevational view in part similar to FIG. 1 showing a further embodiment.
Figure 17:
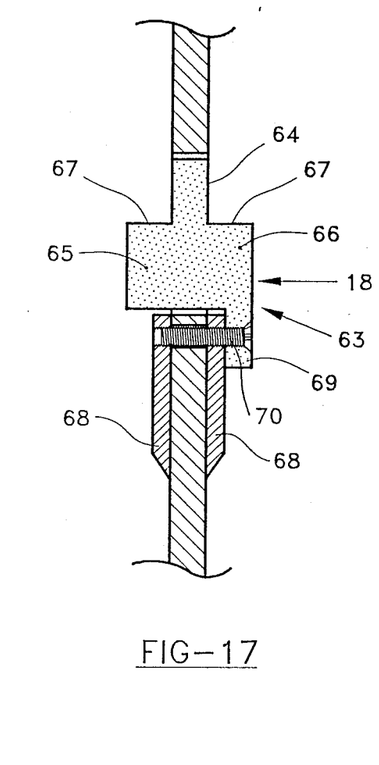
FIG. 17 is a sectional view taken on the line 17-17 of FIG. 16.
Figure 18:
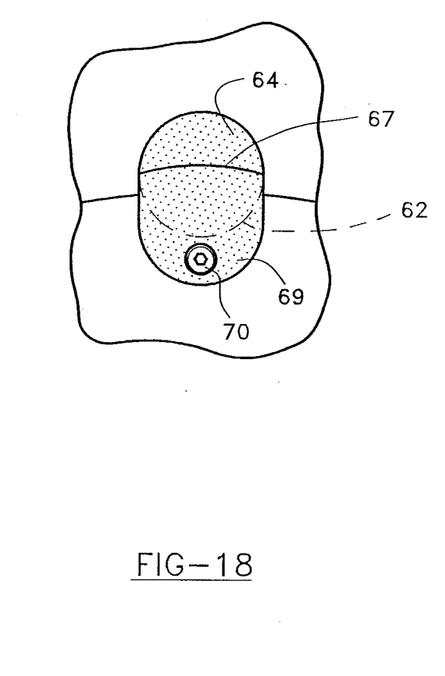
FIG. 18 is a view taken in the direction of the arrow 18 in FIG. 17.

In FIGS. 16 to 18, inclusive, still another form of the invention has been shown. The saW blade assembly has the same peripheral cutting elements 12 as the previously described embodiments. In this embodiment the blade body has an inner ring of circularly spaced circular openings 62. Each cutting block 63 has a cylindrical body portion 64 which fits into a circular opening 62. The body portion 64 has laterally extending side portions 65-66 extending equidistantly from both sides of the blade body 61. The side portions are truncated at 67 to form the cutting edges of the cutting blocks 63.

The blade body is reinforced inwardly of the cutting blocks 63 by reinforcing rings 68. The cutting blocks portion 66 have an inwardly extending appendage 69 that overlies the ring 68 on that side of the blade body 61. A fastener device 70, shown as a screw, extends through the cutting block appendage 69 into the rings 68 and the blade body 61 to secure the cutting block 63 in place on the blade body 61.

The rings 68 are slotted at 71 to assist in coolant flow around the cutting blocks during the sawing operations.

While the invention has been illustrated with respect to several specific embodiments thereof, these embodiments should be considered as illustrative rather than limiting. Various modifications and additions may be made and will be apparent those skilled in the art. Accordingly, the invention should not be limited by the foregoing description, but rather should be defined only by the following claims.

What is claimed is:

1. A circular saw blade assembly for cutting in a single pass a two tier groove in a paved areaway, the saw blade assembly including a single circular blade body of substantially uniform thickness having a plurality of cutting elements in the form of metallic matrices containing fragmented diamond particles secured to the periphery of the blade body, wherein the improvement comprises:
   (a) a plurality of cutting blocks also in the form of metallic matrices containing fragmented diamond particles providing cutting faces,
   (b) the circular blade body intermediate its periphery and its center and at a location remote of the cutting elements having a plurality of discrete spaced cutting block positioning means arranged in a circular configuration concentrically of the blade periphery, and
   (c) retention means securing the cutting blocks to the blade body at the positioning means with cutting faces on opposite sides of the blade body,
   whereby the cutting faces coact to cut a groove in the concrete above and wider than the groove cut by the cutting elements on the blade body periphery.

2. The circular saw blade assembly of claim 1, in which:
   the positioning means comprises a plurality of circularly spaced sets of fastener receiving holes in the blade body, and
   the cutting blocks are bonded to support plates each provided with a set of fastener receiving holes, and
   the retention means comprises fastener devices received in the fastener device receiving holes holding the cutting blocks on opposite sides of the blade body in paired alignment.

3. The circular saw blade assembly of claim 1, in which:
   the blade body is provided with elongated radially extending slots partially underlying the cutting blocks,
   the slots permitting coolant to flow around the cutting blocks during the sawing operation.

4. The circular saw blade assembly of claim 1, in which:
   the positioning means comprise a plurality of fastener receiving holes in the blade body,
   the cutting blocks are bonded to mounting plates provided with fastener receiving holes adapted to be aligned with fastener receiving holes in the blade, and
   the retention means comprise fastener devices engaged with the fastener receiving holes in the mounting plates and blade body,
   the cutting blocks are secured in aligned pairs on opposite sides of the blade body,
   the blade body is provided at the positioning means with elongated slots partially underlying the cutting blocks,
   the slots permitting coolant flow around the cutting blocks during the groove cutting operation.

5. The circular saw assembly of claim 1, in which:

the blade body is provided with radially extending elongated slots partially underlying the cutting blocks, and wear strips are fitted in the slots to minimize the wear on critical areas of the blade body adjacent the cutting blocks.

6. The circular saw assembly of claim 1, in which:

the blade body has at each cutting block positioning means a radially extending elongated slot partially underlying the cutting blocks, and a wear resistant insert is fitted in the slot in alignment with the cutting faces on the cutting blocks to minimize the wear on critical areas of the blade body adjacent the cutting blocks.

7. The circular saw blade assembly of claim 1, in which:

the positioning means comprise a plurality of fastener receiving holes in the blade body, the cutting blocks are bonded to mounting plates provided with fastener receiving holes adapted to be aligned with fastener receiving holes in the blade body, and the retention means comprise fastener devices engaged with the fastener receiving holes in the mounting plates and blade body, the cutting blocks are secured in aligned pairs on opposite sides of the blade body, the blade body is provided between the aligned cutting blocks with a radially extending elongated slot, and a wear resistant insert is fitted in the slot in alignment with the cutting faces on the cutting blocks to minimize the wear on critical areas of the blade body adjacent the cutting blocks, the insert only partially filling the slot to permit coolant flow through the unfilled portion around the cutting blocks during the groove cutting operation.

8. The circular saw blade assembly of claim 1, in which:

the positioning means comprise a plurality of circularly spaced circular ring sector openings, the cutting blocks are arcuately slab-shaped, and each cutting block is mounted on the inner radial surface of the ring sector opening.

9. The circular saw blade assembly of claim 1, in which:

the positioning means comprise a plurality of circularly spaced circular ring sector openings;

the cutting blocks are arcuately slab shaped;

the retention means is a bonding medium for attaching one surface of each cutting block to the inner radial edge of a sector opening; and the sector openings are larger than the slab to provide clearance on all sides except the side bonded to the slab for coolant to flow around the cutting block during the sawing operation.

10. The circular saw blade assembly of claim 1, in which:

the positioning means comprises a plurality of circularly spaced circular ring sector openings, each cutting block is a slab having a length less than the circular width of an opening, a thickness less than the distance between the inner and outer radial edges of an opening and a width greater than the thickness of the blade body, and the retention means comprises a bonding material bonding each cutting block to the inner radial surface of an opening with he block extending laterally of the blade body thereby providing the cutting faces on both sides of the blade body.

11. The circular saw blade assembly of claim 1, in which:

the positioning means comprises a plurality of circularly spaced circular ring sector openings, each cutting block is a slab having a length less than the circular width of an opening, a thickness less than the distance between the inner and outer radial edges of an opening and a width greater than the thickness of the blade body, and the retention means comprises a bonding material bonding each cutting block to the inner radial surface of an opening with the cutting block extending laterally of the blade body thereby providing the cutting faces on both sides of the blade body, the clearance of the openings on all sides except the bonded side of each cutting block is great enough to allow coolant to flow around each cutting block during the sawing operation.

12. The circular saw blade assembly of claim 1, in which:

the positioning means comprises a plurality of circularly spaced, substantially rectangular, openings in the blade body;

each cutting block consists of a square segment and an L-shaped segment, the base of the L-shaped segment being equal in width to the width of the square segment plus the thickness of the blade body whereby the cutting faces of both segments will extend equidistantly from opposite sides of the blade body;

support members bonded to the base of each segment; and the retention means comprises fastener devices extending through the support members and blade body.

13. The circular saw blade assembly of claim 1, in which:

the positioning means comprises a plurality of circularly spaced rectangular openings;

each cutting block is formed of two elongated matrix pieces each impregnated with diamond cutting fragments, one matrix piece is of substantially square cross section and the other of substantially L-shaped cross section, the longitudinal length of each matrix piece is substantially equal to the circumferential length of a rectangular opening and the vertical height of the L shaped cross section is substantially equal to the distance between the inner and outer edges of a rectangular opening, support members bonded to the base of each matrix piece, and the retention means comprise fastener devices securing each of the matrix piece support members to the blade body and to each other adjacent the inner edge of a rectangular opening, the secured matrices forming a cutting block having cutting faces extending equidistantly through the rectangular opening to both sides of the blade body.

14. The circular saw blade assembly of claim 1, in which:

the positioning means comprises a plurality of circularly spaced rectangular openings;

each cutting block is formed of two elongated matrix pieces each impregnated with diamond cutting fragments, one matrix piece is of substantially square cross section and the other of substantially L-shaped cross section, the longitudinal length of each matrix piece is substantially equal to the circumferential length of a rectangular opening and the vertical height of the L is substantially equal to the difference between the inner and outer edges of a rectangular opening, support members bonded to the base of each matrix piece and fastened to the blade, and the rectangular openings are larger than the cutting blocks to provide clearance on all sides except the supported base side for coolant to flow around the cutting block during the sawing operation.

15. The circular saw blade assembly of claim 1, in which:

the positioning means comprises a plurality of circularly spaced circular apertures in the blade body;

each cutting block having a substantially cylindrical body portion adapted to fit into a circular aperture with laterally extending portions extending equidistantly from both sides of the blade body;

the laterally extending portions having the cutting faces thereon;

One of the laterally extending portions having a depending appendage;

the blade body on both sides has reinforcing rings one of which is interposed between the blade body and the depending appendage; and the retention means securing the cutting block to the blade body comprises a fastener device securing the appendage to the rings and the blade body therebetween.

16. The circular saw blade assembly of claim 1, in which:

the positioning means comprises a plurality of circularly spaced circular openings in the blade body; and the rings are slotted to assist coolant flow around the cutting blocks during the sawing operation.

17. A saw blade assembly for cutting a two tier groove for a concrete areaway expansion joint, comprising:

a unitary saw blade body of uniform thickness, a first circular row of cutting element segments in the form of metallic matrices containing fragmented diamond particles, the first circular row of cutting element segments being bonded to periphery of the blade with gaps between adjacent segments, the blade body having radially extending slots communicating with the gaps between the outer circular row of cutting elements, a second circular row of cutting element segments in the form of metallic matrices containing fragmentary diamond particles, the second circular row of cutting element segments being spaced from and located intermediate the periphery and the center of the blade body and including cutting element segments on both sides of the blade body, and retention means securing the second row of cutting element segments to the blade body with gaps between the cutting element segments, whereby the second row cutting element segments coact to cut a groove in the concrete above and wider than the groove being cut by the peripheral row of cutting element segments.

18. A saw blade assembly of claim 17, in which:

the gaps between the first circular row of cutting element segments, the radial slots communicating with said gaps and the gaps between the second row of cutting element segments cooperate to distribute coolant to the cutting element segments during the sawing operation.

19. A saw blade assembly of claim 17, in which:

the cutting element segments of the second row are individually bonded to support members, the support members and the blade have a plurality of complementary fastener receiving holes, and the retention means comprise fastener devices adapted to secure aligned pairs of the second row cutting element segments on both sides of the blade to the blade and each other.

20. A saw blade assembly of claim 17, in which:

elongated slots in the blade underlie the aligned pairs of the second row cutting segments, and wear resistant inserts are inserted in said slots adjacent the cutting faces of the second row cutting element segments to minimize the wear on critical areas of the saw blade, said elongated slots cooperate with the gaps between the first and second rows of cutting element segments and the radial slots to supply coolant to the cutting element segments during the sawing operation.

* * * * *